United States Patent [19]

Tovey et al.

[11] Patent Number: 5,740,414

[45] Date of Patent: Apr. 14, 1998

[54] METHOD AND APPARATUS FOR COORDINATING THE USE OF PHYSICAL REGISTERS IN A MICROPROCESSOR

[75] Inventors: DeForest W. Tovey, Los Gatos, Calif.; Michael C. Shebanow, Plano, Tex.; John Gmuender, Cary, N.C.

[73] Assignee: HAL Computer Systems, Inc., Campbell, Calif.

[21] Appl. No.: 516,230

[22] Filed: Aug. 17, 1995

Related U.S. Application Data

[63] Continuation of Ser. No. 388,364, Feb. 14, 1995, abandoned.

[51] Int. Cl.$^6$ .................... G06F 12/00; G06F 9/30
[52] U.S. Cl. .................................................. 395/580
[58] Field of Search ............... 364/DIG. 1 MS File, 364/DIG. 2 MS File; 395/376, 392, 393, 401, 427, 410, 412, 413, 414, 415, 416, 417, 418, 419, 800, 580

[56] References Cited

U.S. PATENT DOCUMENTS

| 5,197,132 | 3/1993 | Steely, Jr. et al. ............... 395/375 |
| 5,355,457 | 10/1994 | Shebanow et al. .............. 395/375 |

FOREIGN PATENT DOCUMENTS

| 0 297 265 A2 | 1/1989 | European Pat. Off. . |
| 0 301 220 A2 | 2/1989 | European Pat. Off. . |
| 0 514 763 A2 | 11/1992 | European Pat. Off. . |
| 0 515 166 A1 | 11/1992 | European Pat. Off. . |
| 0 606 697 A1 | 7/1994 | European Pat. Off. . |

OTHER PUBLICATIONS

Mayan Moudgill & Keshav Pingali, "Register Renaming and Dynamic Speculation: an Alternative Approach", *IEEE*, Dec. 1, 1993, (pp. 202–213).

*Primary Examiner*—Robert B. Harrell
*Attorney, Agent, or Firm*—Fenwick & West LLP

[57] ABSTRACT

In a microprocessor, an apparatus is included for coordinating the use of physical registers in the microprocessor. Upon receiving an instruction, the coordination apparatus extracts source and destination logical registers from the instruction. For the destination logical register, the apparatus assigns a physical address to correspond to the logical register. In so doing, the apparatus stores the former relationship between the logical register and another physical register. Storing this former relationship allows the apparatus to backstep to a particular instruction when an execution exception is encountered. Also, the apparatus checks the instruction to determine whether it is a speculative branch instruction. If so, then the apparatus creates a checkpoint by storing selected state information. This checkpoint provides a reference point to which the processor may later backup if it is determined that a speculated branch was incorrectly predicted. Overall, the apparatus coordinates the use of physical registers in the processor in such a way that: (1) logical/physical register relationships are easily changeable; and (2) backup and backstep procedures are accommodated.

8 Claims, 7 Drawing Sheets

METHOD AND APPARATUS FOR COORDINATING THE USE OF PHYSICAL REGISTERS IN A MICROPROCESSOR

RELATED APPLICATIONS

This application is a continuation of U.S. patent application Ser. No. 08/388,364, filed on Feb. 14, 1995, now abandoned, having the same title and inventors as the present application.

The subject matter of this application is related to the subject matter of application Ser. No. 08/888,602, pending, entitled "Instruction Flow Control Circuit for Superscaler Microprocessor," filed on Feb. 14, 1995 by Takeshi Kitahara, application Ser. No. 08/388,389, abandoned, entitled "Addressing Method for Executing Load Instructions Out of Order with Respect to Store Instructions," by Michael Simone and Michael Shebanow, application Ser. No. 08/388,606, pending, entitled "Method and Apparatus for Efficiently Writing Results to Renamed Registers" filed on Feb. 14, 1995 by DeForest Tovey, Michael Shebanow and John Gmuender, application Ser. No. 08/478,025, pending entitled "Processor Structure and Method for Aggressively Scheduling Long Latency Instructions Including Load/Store Instructions While Maintaining Precise State" fried on Feb. 14, 1995 by Gene W. Shen, John Szeto, Niteen A. Patkar, Michael A. Simone and Michael C. Shebanow, application Ser. No. 08/483,958, pending, entitled "Processor Structure and Method for Maintaining And Restoring Precise State at Any Instruction Boundary" filed on Feb. 14, 1995 by Gene W. Shen, John Szeto, Niteen A. Patkar and Michael C. Shebanow, application Ser. No. 08/390,885, abandoned, "Processor Structure and Method for Tracking Instruction Status to Maintain Precise State" filed on Feb. 14, 1995 by Gene W. Shen, John Szeto, Niteen A. Patkar and Michael C. Shebanow, application Ser. No. 08/473,223, pending, entitled "Processor Structure and Method for a Time-Out Checkpoint" filed on Feb. 14, 1995 by Gene W. Shen, John Szeto, Niteen A. Patkar and Michael C. Shebanow, application Ser. No. 08/484,795, pending entitled "Processor Structure and Method for Tracking Floating-Point Exceptions" filed on Feb. 14, 1995 by Gene W. Shen, John Szeto and Michael C. Shebanow, application Ser. No. 08/472,394, pending, entitled "Processor Structure and Method for Renamable Trap-Stack" filed on Feb. 14, 1995 by Hideki Osone and Michael C. Shebanow, and application Ser. No. 08/482,075, pending, entitled "Processor Structure and Method for Watchpoint for Plural Simultaneous Unresolved Branch Evaluation" filed on Feb. 14, 1995 by Gene W. Shen, Hideki Osone, Takumi Maruyama and Michael C. Shebanow, each having the same assignee as the present invention.

FIELD OF THE INVENTION

This invention relaters generally to microprocessors and more particularly to a method and apparatus for efficiently coordinating the use of physical registers in a microprocessor during instruction execution.

BACKGROUND OF THE INVENTION

In a typical microprocessor, instructions are executed in a serial fashion. That is, a stream of instructions, is executed by the microprocessor in the order in which the instructions are received. While this method of execution is effective, in many cases is not optimal. To elaborate, many instruction sequences in a computer program are independent of other instruction sequences. For example, in the following instruction stream,

```
1  Load LR1, Mem1    ;Load logical register LR1 with data from Mem1
2  Inc LC1           ;Increment logical register LR1
3  Store LR1, Mem1   ;Store contents of logical register LR1 into Mem2
4  Load LR2, Mem2    ;Load logical register LR2 with data from Mem2
5  Inc LR2           ;Increment logical register LR2
6  Store LR2, Mem2   ;Store contents of logical register LR2 into
                      Mem2,
``` the second three instructions (instruction 4–6) are independent of the first three instructions (instruction 1–3). That is, instructions 4–6 do not depend on the results of instructions 1–3 to execute properly. Thus, in this example, instructions 1–3 and instructions 4–6 could be executed in parallel to optimize performance. It is this concept of executing instructions in parallel, out of sequence, which underlies the executing methods of superscalar processors.

To provide for this parallel execution capability, superscalar processors typically comprise more physical registers than there are logical registers. Logical registers are registers, such as LR1 and LR2 in the example above, which are referenced in the instructions. Physical registers are the registers within the processor which are actually used for storing data during processing. The extra physical registers are needed in superscalar processors in order to accommodate parallel processing. One consequence of having more physical registers than logical registers is that there is no one-to-one correspondence between the logical and physical registers. Rather, a physical register may correspond to logical register LR1 for one set of instructions and then correspond to logical register LR2 for another set of instructions. Because the relationship between logical and physical registers can change, a mapping or coordination function is performed in order to keep track of the changing relationships. In order to optimize performance in a superscalar processor, an efficient method and apparatus for coordinating the use of the physical registers is needed.

SUMMARY OF THE INVENTION

In accordance with the present invention, there is provided an apparatus, comprising a register file unit, a register reclaim file unit, a freelist unit, and a control unit, which coordinates the use of physical registers in a microprocessor in such a manner that allows for easy physical register assignment and convenient state restoration. The overall operation of the apparatus of the present invention is controlled by the control unit. In operation, the control unit receives an instruction, and in response, extracts a destination logical register value from the instruction. Then, the control unit obtains a free physical register tag from the freelist unit which points to a particular physical register within the processor. Once the destination logical register value and the free physical register tag are obtained, the control unit stores the logical register value into the register file unit in association with the obtained physical register tag. By so doing, a relationship is established between the logical register value and the physical register tag which can be used to map the logical register value to the particular physical register. A physical register is thus assigned or mapped to a logical register value.

In addition to establishing logical/physical register relationships, the apparatus of the present invention also performs at least two other important functions. First, if the instruction received is a branch instruction, then the apparatus creates a "checkpoint" which captures the current state of the processor. This checkpoint provides a reference point to which the processor can backtrack or backup if it is later determined that an incorrect branch was chosen. By creating these checkpoints, the apparatus of the present invention supports speculative execution. As a second important function, when the apparatus of the present invention assigns a new physical register to a logical register value, the old relationship between the logical register value and another physical register is saved in the register reclaim file unit. This is done so that if an execution exception (such as a divide-by-zero) is encountered which requires the execution of a trap handler, the old relationship can be easily restored. By so doing, the apparatus of the present invention provides the processor with a means for conveniently back-stepping to a particular instruction before accessing a trap handler. Overall, the present invention provides a convenient and efficient method and apparatus for coordinating the use of physical registers in a microprocessor.

DETAILED DESCRIPTION OF THE PREFERRED EMBODIMENTS

Figure 1:
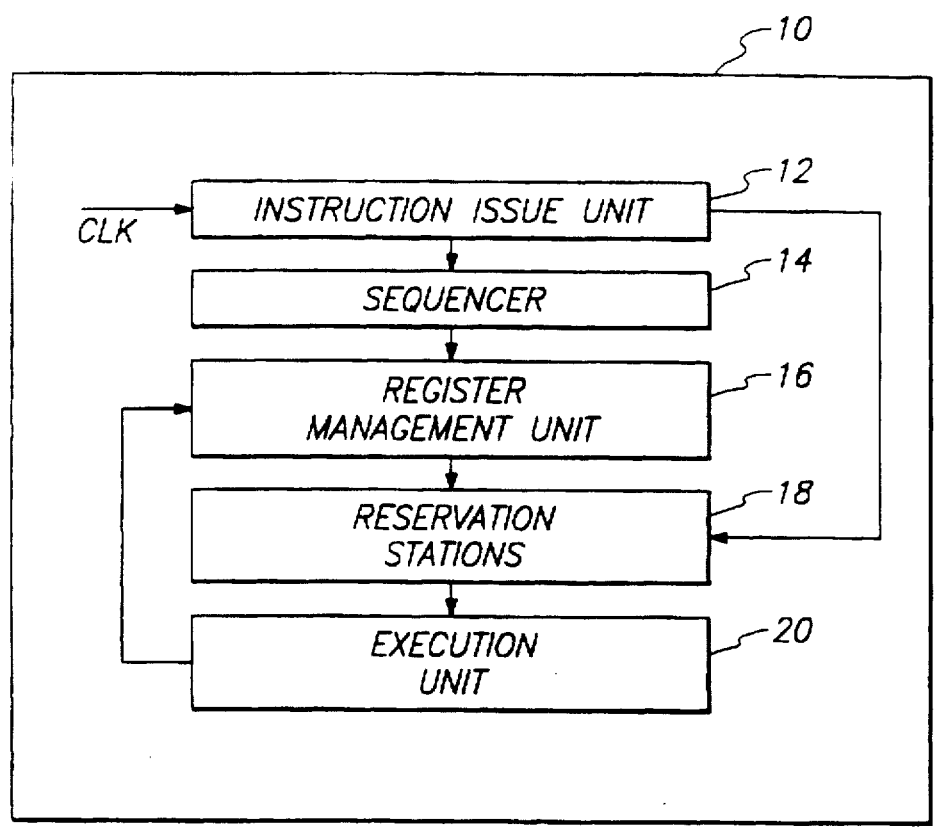
FIG. 1 is a block diagram representation of a processor wherein the present invention is implemented.

With reference to FIG. 1, there is shown a block diagram representation of a processor 10 wherein the present invention is implemented. As shown, processor 10 preferably comprises an instruction issue unit 12, a sequencer 14 coupled to the instruction issue unit 12, a register management unit 16 coupled to the sequencer 14, reservation stations 18 coupled to both the register management unit 16 and the instruction issue unit 12, and an execution unit 20 coupled to the reservation stations 18 and the register management unit 16. In the preferred embodiment, processor 10 is a superscalar processor capable of executing multiple instructions in parallel.

In processor 10, the instruction issue unit 12 receives from an external source (not shown) a series of instructions, and stores these instructions for later execution. The instruction issue unit 12 receives a clock signal as input and in each clock cycle, unit 12 issues one or more instructions for execution. The issued instructions are sent to both the sequencer 14 and the reservation stations 18. The sequencer 14, in response to the issued instructions, assigns a sequence number (Sn) to each of the instructions. As will be explained later, these sequence numbers are used by the register management unit 16 to keep track of the instructions. Once the sequence numbers are assigned to the instructions, the sequencer 14 forwards the instructions to the register management unit 16.

Background Considerations

Before describing unit 16 in detail, some background information relating to logical and physical registers will first be provided in order to facilitate a full understanding of the invention. Typically, computer instructions reference logical registers. These logical registers (which will be referred to herein as LR) may be source registers which contain certain data needed to execute the instruction, or these registers may be destination registers to which data resulting from the execution of the instruction is to be written. For example, in the instruction

LR1÷LR2→LR3, which divides the contents of LR1 by the contents of LR2 and writes the result into LR3, LR1 and LR2 are the source registers while LR3 is the destination register.

A point to note about logical registers is that they are nothing more than logical values. They do not point to any physical location at which a physical register resides. To get from a logical register value to a physical register, a translation or mapping process is carded out. This mapping function is one of the functions performed by the register management unit 16. If there were a one-to-one correspondence between logical and physical registers, and if their relationships were constant, then the mapping function would be a simple one. All that would be needed is a static translation table. However, as noted previously, there is no constant one-to-one correspondence in superscalar processors. Instead, relationships between logical and physical registers are constantly changing. Hence, the register management unit 16 needs to be able to handle the changing relationships.

As an additional complication, superscalar processors engage in speculative execution. That is, whenever a branch instruction is encountered, a guess or prediction is made as to which branch will actually be taken. Once the prediction is made, the instructions following the predicted branch are executed. If later it is determined that the wrong branch was predicted, then the processor 10 will need to backtrack or "backup" to the branch instruction, choose the proper branch, and then execute instructions following that branch. In order to backup properly, the processor 10 will need to be restored to the state just prior to the branching operation. This involves, among other operations, restoring the relationships between the logical and physical registers. To accommodate this backup procedure, the register management unit 16 preferably coordinates the use of the physical registers in such a way that relationship restoration is possible.

As yet a further complication, superscalar processors process instructions in parallel and out of sequence. As a result, if an execution exception (such as a divide-by-zero) is encountered which requires the execution of a trap handler, it becomes necessary to "backstep" to the instruction invoking the exception before executing the trap handler. Like the backup procedure, this "backstep" procedure involves, among other operations, restoring the relationships between the logical and physical registers. Unlike the backup procedure, however, backstepping involves an instruction other than a branch instruction. This requires different handling, as will be explained below. The management unit 16 preferably manages the use of the physical registers in such a way that allows for this backstepping procedure. With the above background information in mind, the register management unit 16 will now be described in greater detail.

Register Management Unit

Figure 2:
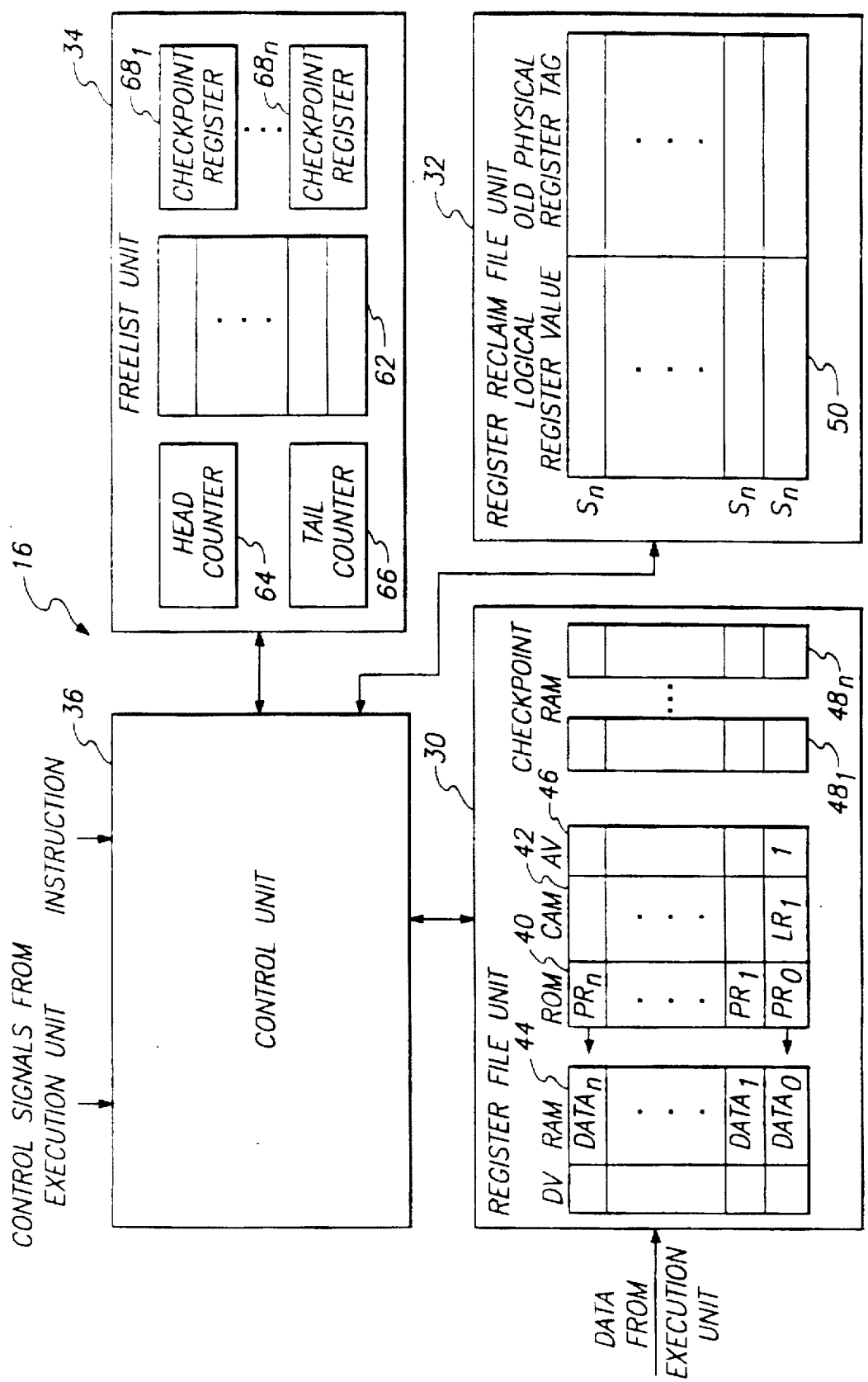
FIG. 2 is a detailed block diagram representation of the register management unit 16 of the present invention.

FIG. 2 shows a detailed block diagram of the preferred embodiment of the register management unit 16. As shown, management unit 16 preferably comprises a register file unit 30, a register reclaim file unit 32, a freelist unit 34, and a control unit 36 for controlling the overall operation of the management unit 16.

Register File Unit

The register file unit 30 is the component (or set of components) in management unit 16 which is mainly responsible for mapping logical registers to physical registers, and for storing data. Register file unit 30 preferably comprises a number of different components, including a read-only-memory (ROM) 40, a content addressable memory (CAM) 42, a data random access memory (data RAM) 44, an address valid (AV) RAM 46, and at least one, and preferably a plurality of checkpoint RAM's $48_1$–$48_n$. In register file unit 30, the ROM 40 is used to store all of the physical register tags $PR_0$–$PR_n$ for all of the physical registers in the processor 10. Each of the physical address tags $PR_0$–$PR_n$ points to an entry in the data RAM 44 wherein data corresponding to the physical register tag is stored, along with a data valid (DV) bit. Preferably, there is a one-to-one correspondence between the entries of the ROM 40 and the entries of the data RAM 44. Since the physical register tags $PR_0$–$PR_n$ are stored in ROM 40, they cannot be altered by writing operations; hence, the physical register tags $PR_0$–$PR_n$ remain constant for the life of the processor 10.

The CAM 42 in register file unit 30 is used to store logical register values corresponding to the physical register tags. Unlike ROM 40, the contents of the CAM 42 can be and are frequently changed. Preferably, there is a one-to-one correspondence between the entries of the CAM 42, the AV RAM 46, and the ROM 40, as shown in FIG. 2. Together, ROM 40, CAM 42, and AV RAM 46 provide a mechanism for quickly and easily assigning a physical register to a logical register. To illustrate, suppose that it is desirable to assign physical register $PR_0$ to logical register $LR_1$. To establish such a relationship, all that needs to be done is to store the logical register value $LR_1$ into the entry of the CAM 42 corresponding to the physical register tag $PR_0$, and to set the AV bit in AV RAM 46 corresponding to the physical register tag $PR_0$. Once that is done, the next time the logical register $LR_1$ is asserted in an instruction, the CAM 42 will search for $LR_1$ and will signal a "hit" in the entry corresponding to the physical register tag $PR_0$. This, in turn, will cause the tag $PR_0$ to be outputted from the ROM 40, which in turn, will cause the corresponding entry in the data RAM 44 to be accessed. Thus, as shown by this example, storing a logical register value in CAM 42 establishes a direct relationship between a logical address and a physical address. To alter this relationship and to establish a new one, all that is needed is to store the logical register value $LR_1$ into a different entry in the CAM 42.

Register file unit 30 preferably further comprises checkpoint RAM's $48_1$–$48_n$ for temporarily storing the contents of the AV RAM 46. As will be explained in greater detail in a later section, whenever a speculative branch instruction is encountered, a "checkpoint" is made by storing the contents of the AV RAM 46 into one of the checkpoint RAM's $48_1$–$48_n$. By storing the contents of the AV RAM 46, the state of the system prior to branching is captured. This checkpoint provides a reference point to backup to in case an incorrect branch is predicted. Register file unit 30 preferably comprises a plurality of checkpoint RAM's 48 in order to allow a plurality of checkpoints to be made. This in turn allows the processor 10 to execute through multiple levels of nested branches.

Register Reclaim File Unit

The register reclaim file unit 32 is the component in management unit 16 which makes it possible for the unit 16 to backstep to an instruction causing an execution exception. Preferably, unit 32 comprises a reclaim RAM 50 having a plurality of entries, with each entry having a first portion for storing a logical register value and a second portion for storing an old physical register tag. Each of the entries in the reclaim RAM 50 is preferably indexed with a sequence number corresponding to a particular instruction. In effect, each entry of the reclaim RAM 50 stores a state of the system just prior to the execution of a particular instruction. Hence, with the information stored in reclaim RAM 50, it is possible to restore the system to the state that it had just prior to any instruction. This aspect of the management unit 16 makes backstepping possible.

Freelist Unit

Register management unit 16 preferably further comprises a freelist unit 34 for storing the physical register tags which are free and can be assigned to logical registers. The freelist unit 34 preferably comprises a freelist RAM 62 for storing free physical address tags, a head register 64 for storing a "head" pointer, a tall register 66 for storing a "tail" pointer, and at least one, and preferably a plurality of checkpoint registers $68_1$–$68_n$. The freelist RAM 62 is preferably operated as a FIFO storage. The head pointer points to the next physical register tag in the RAM 62 which should be assigned to a logical register, while the tail pointer points to the last physical register tag stored in the RAM 62. Each time a free physical register tag is assigned to a logical register, the head pointer is incremented, and each time a free physical register tag is added to the RAM 62, the tall pointer is incremented. Preferably, the freelist RAM 62 has at least P-L entries where P is the number of physical register tags and L is the number of logical register values.

With regard to the checkpoint registers $68_1$–$68_n$, these are used to store the value of the head pointer whenever a speculative branch instruction is encountered. By storing the value of the head pointer, the state of the freelist unit 34 is saved. This in turn allows the state of the freelist RAM 62 to be restored if necessary. The checkpoint registers 48 provide support for the backup procedure. Preferably, freelist unit 34 comprises a plurality of checkpoint registers 48 to allow multiple checkpoints to be made. Multiple checkpoints enable the processor 10 to execute through multiple levels of nested branches.

Control Unit

The register management unit 16 preferably further comprises a control unit 36 for coordinating the operation of the other components 30, 32, 34, and for controlling the overall operation of the management unit 16. In the preferred embodiment, the control unit 36 is implemented in hardware as a state machine. The control unit 36 will be described in greater detail as operation of the processor 10 is described.

Reservation Stations

Referring once again to FIG. 1, the reservation stations 18 of the processor 10 are responsible for two primary functions. First, the reservation stations 18 capture all of the source data needed to execute an instruction. This data is received from the register management unit 16. Second, reservation stations 18 schedule instructions for execution. Instructions may be selected for execution if the DV bits from register file unit 30 are asserted for all sources and if no older instructions stored in the reservation stations are eligible. The instructions, once selected, are passed on to the execution unit 20 for execution. Overall, stations 18 are responsible for the smooth execution of instructions. All of the relevant elements of the processor 10 have now been discussed. The overall operation of the processor 10 will now be described.

Initialization

Before the processor 10 is used in regular operation, it first needs to be initialized. Several steps are carded out in the initialization process. First, each and every logical register value is stored into one of the entries of the CAM 42. The AV bits corresponding to the CAM entries in which logical register values are stored are set. This ensures that before operation, all of the logical register values are validly mapped to a physical register. The particular mapping (i.e. which logical register value is mapped to which physical register) is arbitrary. No single logical register value is mapped to more than one physical register, however.

Once all of the logical register values are stored into the CAM 42, the free physical register are known. Accordingly, the physical register tags corresponding to the free registers are stored into the freelist RAM 62. This provides an indication as to which physical registers are free and may be assigned.

Figure 3A:
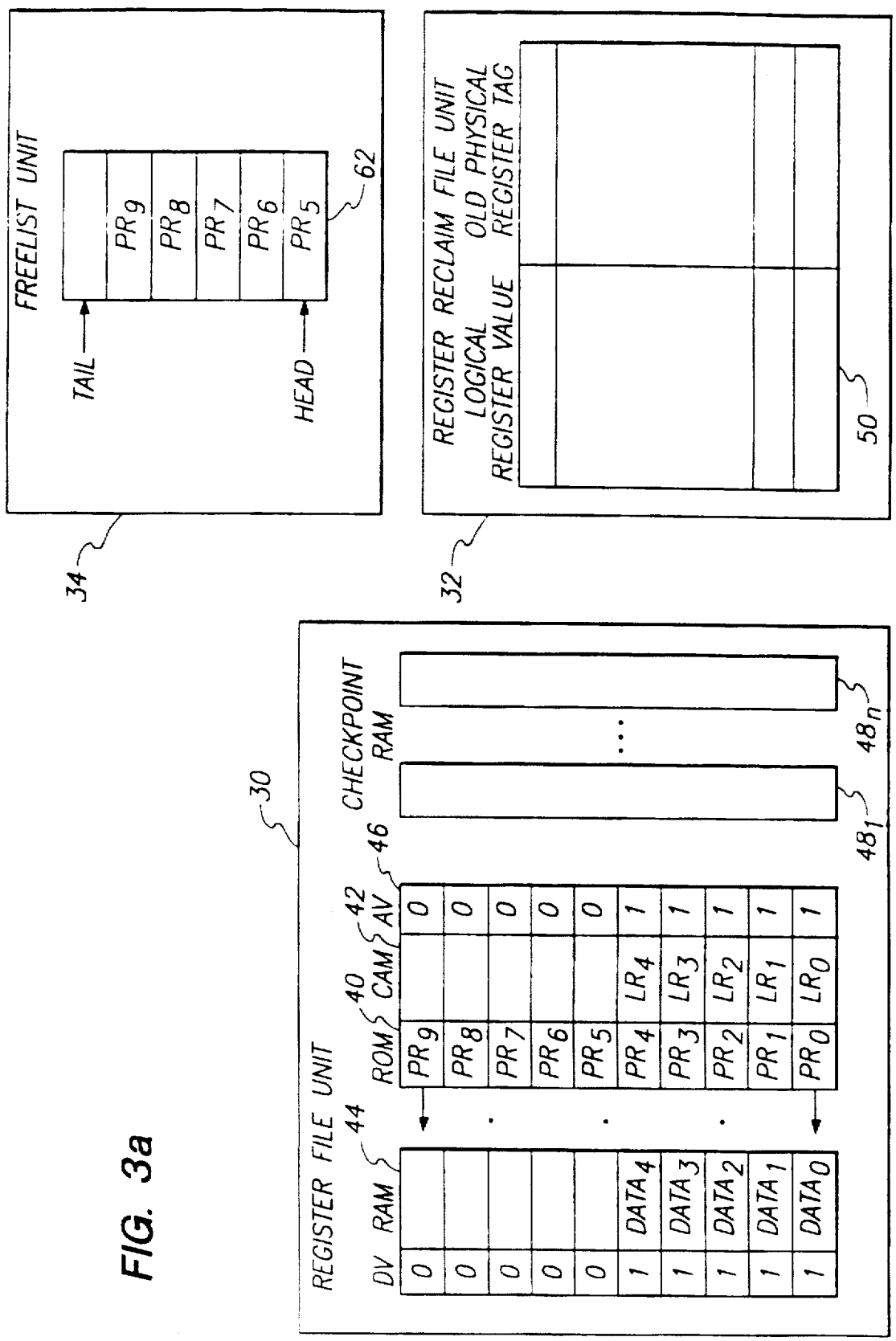
FIGS. 3a, 3b, and 3c are block diagram representations of the register file unit 30, the register reclaim file unit 32, and the freelist unit 34 of the register management unit 16 in several sample states.

As an example, suppose that the management unit 16 is initialized as shown in FIG. 3a. More specifically, suppose that physical register $PR_0$ has been assigned to logical register $LR_0$, $PR_1$ has been assigned to $LR_1$, $PR_2$ has been assigned to $LR_2$, $PR_3$ has been assigned to $LR_3$, and $PR_4$ has been assigned to $LR_4$. After assignment, data ($Data_0$–$Data_4$) may be written into the corresponding locations in the data RAM 44, along with asserted data valid bits. As shown in FIG. 3a, physical registers $PR_5$–$PR_9$ have not been assigned to any logical register value. Thus, they are considered "free", which means that they may be assigned logical register values in upcoming operations. Thus, the physical register tags $PR_5$–$PR_9$ associated with the free physical registers are stored in the freelist unit 34. The head pointer in the freelist unit is pointing to $PR_5$, thereby indicating that $PR_5$ will be the next physical register assigned to a logical register value. Currently, no information is stored in the register reclaim file unit 32.

Regular Operation

Now, suppose that the instruction issue unit 12 issues the following instruction:

$$LR_0 \div LR_1 \rightarrow LR_3.$$

This instruction, when executed, will cause the data in logical registers $LR_0$ to be divided by the data in logical register $LR_1$, and will cause the result to be stored into logical register $LR_3$. For this instruction, logical registers $LR_0$ and $LR_1$ are the source logical registers from which data will be drawn, while logical register $LR_3$ is the destination logical register. Once issued, the instruction is passed on to the sequencer 14, where a sequence number is assigned to the instruction. Suppose that sequence number 0 is assigned. Thus, the instruction becomes:

Instruction #0: $LR_0 \div LR_1 \rightarrow LR_3$.

Once a sequence number is assigned, the instruction is passed on to the control unit 36 of the register management unit 16 for processing.

Figure 4:
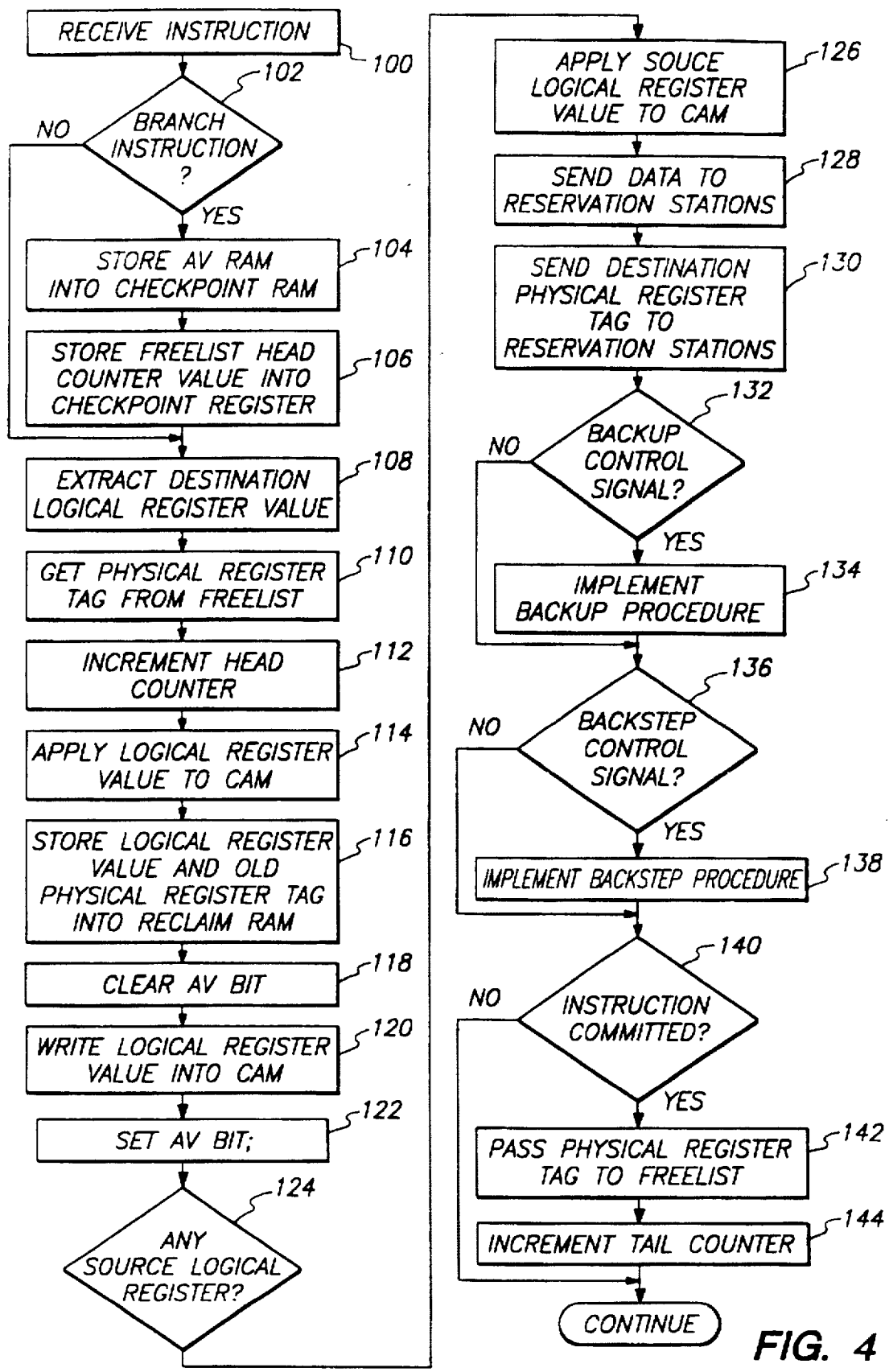
FIG. 4 is an operational flow diagram of the control unit 36 of the control unit 36 of the register management unit 16.

In the management unit 16, it is the control unit 36 which receives and processes new instructions. An operational flow diagram for the control unit 36 is shown in FIG. 4. Preferably, control unit 36 begins operation by receiving 100 the instruction and then determining 102 whether the instruction is a speculative branch instruction. If the instruction is a speculative branch instruction, then control unit 36 preferably creates a "checkpoint" to provide a reference point to which the processor 10 can backup in case the wrong branch of the branch instruction is predicted. In creating a checkpoint, two operations are taken. First, the contents of the AV RAM 46 are stored 104 into one of the checkpoint RAM's $48_1$–$48_n$. This operation preserves for later reference all of the current relationships between the logical registers and the physical registers. Second, the contents of the head counter 64 in the freelist unit 34 are stored 106 into one of the checkpoint registers $68_1$–$68_n$. By storing these two sets of information, the current state of the processor 10 is recorded. This information may be retrieved at a later time to restore the state of the processor 10 to that just prior to the execution of the speculative branch instruction. As will be explained in greater detail later, this aspect of the management unit 16 enables the processor 10 to carry out the backup procedure of the present invention.

In the present example, the instruction ($LR_0 \cdot LR_1 \rightarrow LR_3$) is not a speculative branch instruction; thus, control unit 36 bypasses steps 104 and 106 and proceeds to step 108 to extract a destination logical register value from the instruction. In the present example, the destination logical register value is $LR_3$. Once the destination logical register value is extracted, control unit 36 accesses the freelist RAM 62 to extract 110 the next available physical register tag therefrom. As shown in FIG. 3a, the head pointer is currently pointing to physical register tag $PR_5$; thus, $PR_5$ is selected as the physical register to assign to the logical register $LR_3$. Thereafter, control unit 36 increments 112 the head counter 64 to cause the counter to point to the next available free physical register, which in the example is $PR_6$.

Figure 3B:
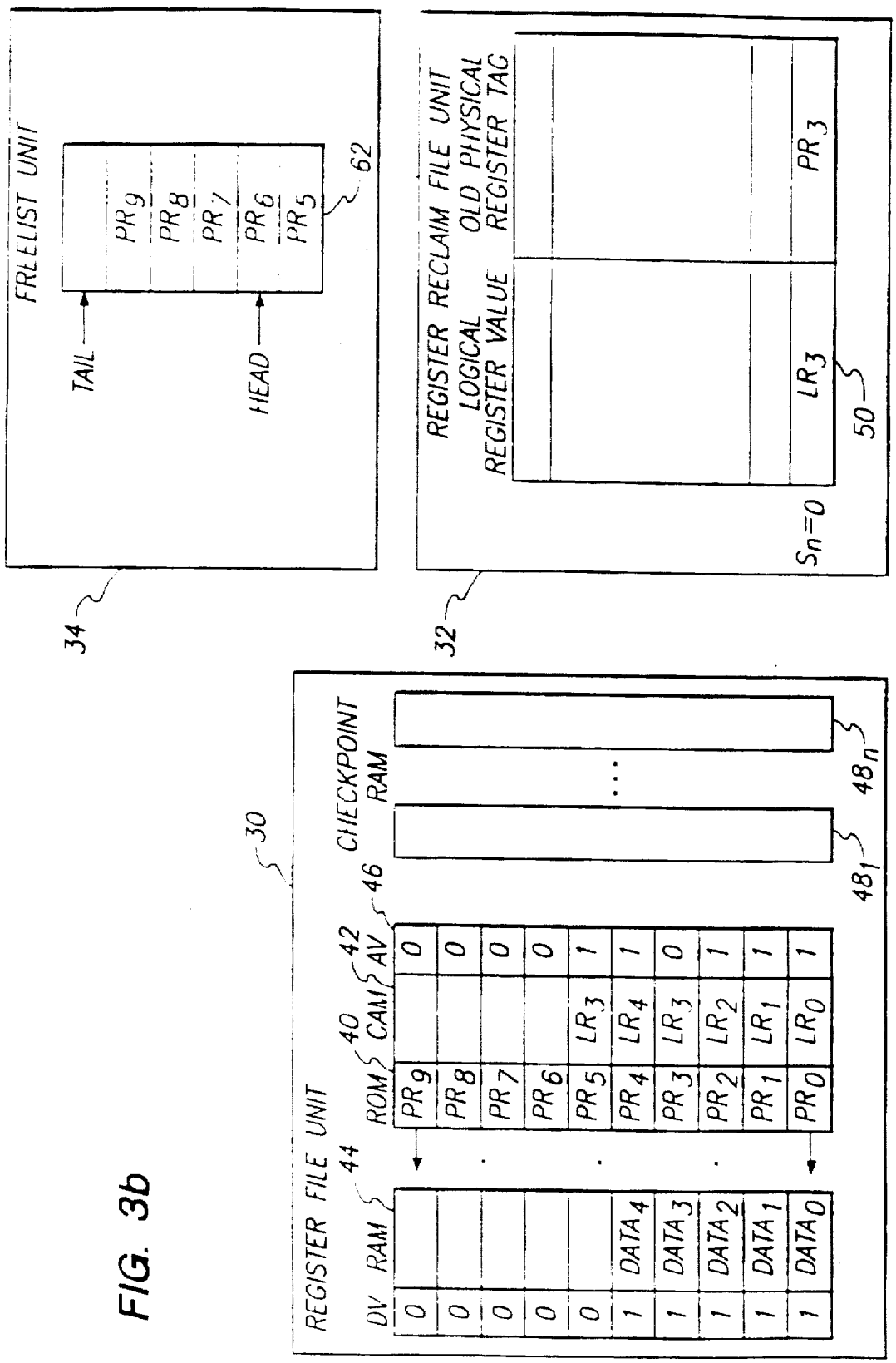

After a physical register tag is retrieved from the freelist unit 34, control unit 36 applies 114 the logical register value $LR_3$ to the CAM 42. In effect, this operation checks for the current physical register assignment for logical register $LR_3$. In the present example, $LR_3$ is currently assigned to physical register $PR_3$, as shown in the register file unit 30. Thus, when $LR_3$ is applied to the CAM 42, a hit will be found which will cause the physical register tag $PR_3$ to be read out of the ROM 40. This physical register tag $PR_3$, along with the logical register value $LR_3$, is then stored into the reclaim RAM 50 in the entry corresponding to the sequence number of the current instruction (sequence #0), as shown in FIG. 3b. The information in reclaim RAM 50 will be used, if necessary, to backstep the processor 10 at a later time to the current state of the processor 10.

After the logical register value $LR_3$ and its corresponding old physical register tag $PR_3$ are stored into the reclaim RAM 50, control unit 36 clears the AV bit corresponding to the old physical register assignment, which in the example is the AV bit in AV RAM 46 corresponding to the physical register tag $PR_3$. Once that is done, control unit 36 loads 120 the logical register value $LR_3$ into the CAM 42 in the entry corresponding to the new physical register tag, which is $PR_5$. The logical register value $LR_3$ is thus assigned to a new physical register. Thereafter, the AV bit corresponding to physical register $PR_5$ is set 122 to indicate that this is now the current physical register assignment for logical register $LR_3$. Note, however, that the data valid DV bit corresponding to $PR_5$ is not set. This is because no data has yet been written into the corresponding entry of the data RAM 44 because the instruction has not yet been executed. The DV bit will be set once the instruction is executed and appropriate data is stored into the proper entry of the data RAM 44.

Note from FIG. 3b that at this point, the CAM 42 has two entries wherein logical register value $LR_3$ is stored. This would appear to cause confusion. However, note that only the AV bit corresponding to the current physical register assignment ($PR_5$) is set, thereby indicating that the entry corresponding to $PR_5$ is the current assignment. The AV bit corresponding to the old physical register ($PR_3$) is not set. This manipulation of the AV bit forestalls any confusion that might arise due to multiple instances of the same logical register value. Using the process thus far described, a destination logical register may be assigned to a new and different physical register.

The assignment of a new physical register to a destination logical register is only one of the functions performed by control unit 36. The other function is to retrieve the source data needed to execute the instruction. Steps 124–130 of FIG. 4 illustrate this retrieval process. In the present example, the source logical registers are $LR_0$ and $LR_1$. Hence, in order to execute the instruction, data will need to be retrieved from the storage registers indicated by $LR_0$ and $LR_1$.

In carrying out the retrieval process, control unit 36 first determines 124 whether any source logical registers are indicated by the instruction. If source logical registers are indicated by the instruction, as is the case in the present example, then control unit 36 begins the retrieval process by applying 126 the source logical registers $LR_0$, $LR_1$ to the CAM 42. Specifically, when $LR_0$ is applied to CAM 42, a hit is found in the entry of the CAM 42 corresponding to physical register tag $PR_0$. Since the AV bit for this entry is set to "1", this hit causes the physical register tag $PR_0$ to be outputted from the ROM 40, which in turn, causes the corresponding data ($Data_0$) to be outputted from the data RAM 44. The data from logical register $LR_0$ is thereafter sent 128 to the reservation stations 18. Since the data valid DV bit for this entry is set to "1", the data will be used by the reservation stations in executing the instruction. A similar process takes place when $LR_1$ is applied to the CAM 42. Specifically, the application of $LR_1$ causes a hit to be found in the entry of the CAM 42 corresponding to physical register tag $PR_1$. This hit causes the physical register tag $PR_1$ to be outputted from ROM 40. This in turn causes the data ($Data_1$) corresponding to $PR_1$ to be outputted from the data RAM 44 to the reservation stations. Data from logical register $LR_1$ is thus passed on to the reservation stations. Again, since the data valid bit corresponding to the outputted data is set, the reservation stations 18 will use the data in executing the instruction.

After data from the source logical registers $LR_0$, $LR_1$ are sent to the reservation stations 18, control unit 36 further sends 130 the physical register tag assigned to the destination logical register. In the present invention, the destination logical register is $LR_3$ and the physical register assigned to $LR_3$ is $PR_5$. Hence, in step 130, control unit 36 sends physical address tag $PR_5$ to the reservation stations. After step 130, the reservation stations 18 have all of the information needed to execute the instruction. Thus, stations 18 schedule the instruction for execution, and at the appropriate time, sends the instruction along with the information discussed above to the execution unit 20. In response, execution unit 20 executes the instruction and writes the resulting data into an appropriate entry in the data RAM 44. Since the physical register tag $PR_5$ was sent to the execution unit 20, the resulting data will be written into the entry of the data RAM 44 corresponding to the physical register tag $PR_5$, which is the correct entry. In addition, execution unit 20 preferably sets the data valid bit corresponding to the entry to indicate that the data in the entry is now valid and can be used as source data. Thereafter, execution of the instruction is complete.

The process described above is what takes place when an instruction executes smoothly. However, as noted previously, two events may occur which may affect smooth execution. The first event is an acknowledgment that an incorrect branch was taken at a speculative branch instruction. The second event is the invocation of an execution exception which requires a trap handler to be executed. To remedy the first event, a backup procedure is implemented to restore the processor 10 to the state it had just prior to the branch instruction. To remedy the second event, a backstep procedure is implemented to restore the processor 10 to the state it had just prior to the instruction invoking the execution exception. In the event that an incorrect branch was taken, the sequencer 14 will issue a "backup" control signal to the control unit 36 of the register management unit 16. In the event of an execution exception, the execution unit 20 will issue a "backstep" control signal to the control unit 36. In steps 132 and 136, control unit 36 checks for these control signals. If one of these control signals is detected, then control unit 36 will take appropriate action.

Backup Procedure

Figure 3C:
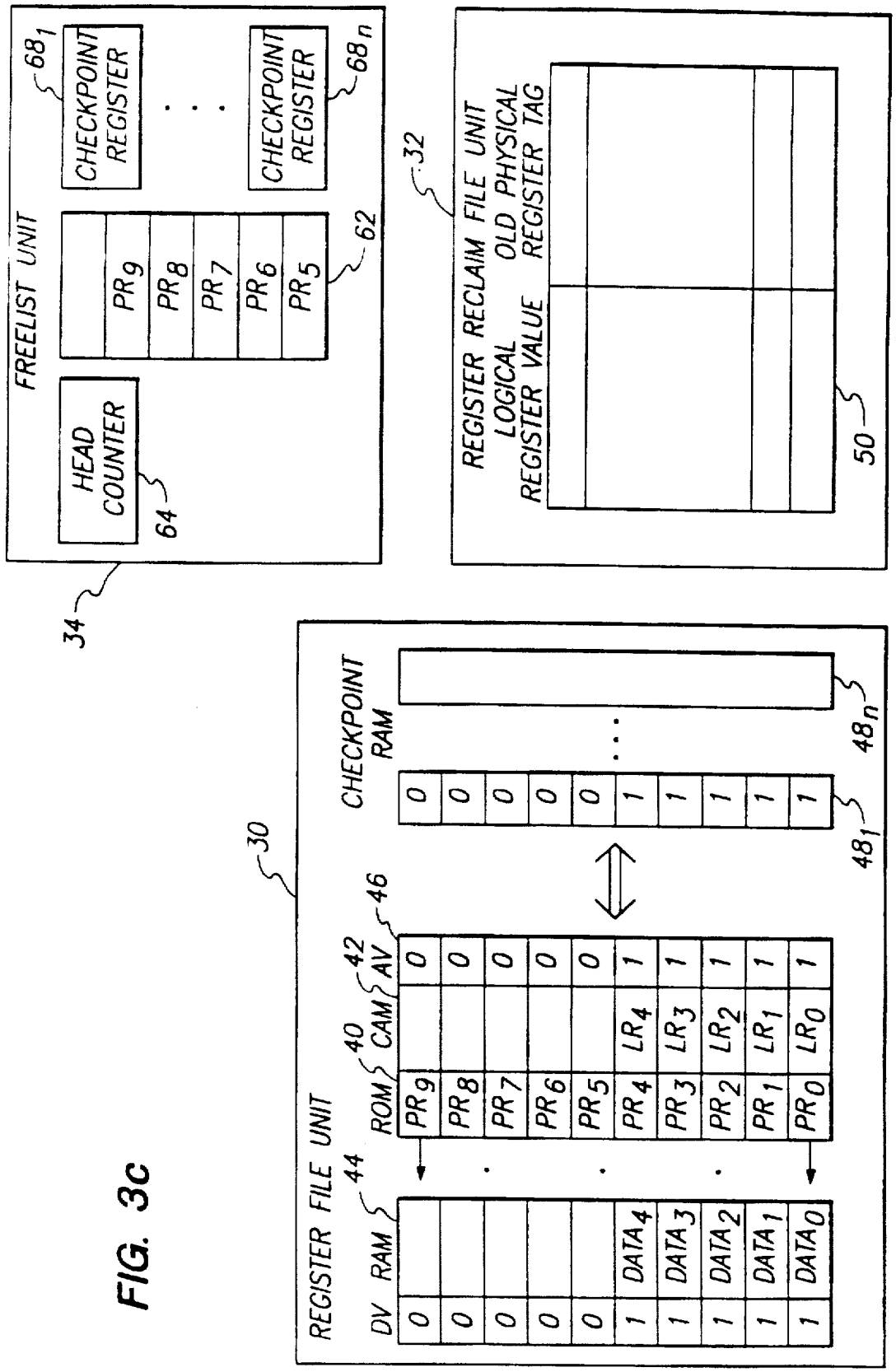

To illustrate the backup procedure, suppose that a speculative branch instruction is issued and sent to the register management unit 16. In processing this instruction, control unit 36 first determines 102 (FIG. 4) whether the instruction is a speculative branch instruction. If the instruction is a speculative branch instruction, as it is in the present example, then control unit 36 proceeds to carry out steps 104 and 106 to create a "checkpoint". In step 104, the contents of the AV RAM 46 are stored into one of the checkpoint RAM's 48I, as shown in FIG. 3c. In step 106, the contents of the head counter 64 in the freelist unit 34 are stored into one of the checkpoint registers $68_I$. These two operations preserve the state of the processor 10 prior to execution of the branch instruction to create a reference state to which the processor may return. Once that is done, the instruction is processed in the same manner as other instructions.

Figure 5:
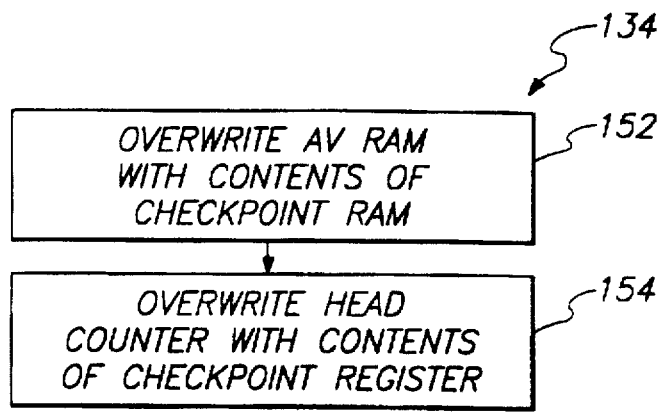
FIG. 5 is a more detailed flow diagram for the backup process 134 of FIG. 4.

Suppose now that during the following instruction or several instructions thereafter it is discovered that a speculative branch was mis-predicted and that a wrong branch was taken. In such a case, it will be necessary to restore the processor 10 to the state that it had just prior to the branch instruction. This restoration or backup is achieved as follows. First, the sequence 14 generates and sends a "backup" signal to the control unit 36. This "backup" signal is detected by control unit 36 in step 132 and in response, control unit 36 implements the backup procedure shown in FIG. 5. Preferably, control unit 36 begins the backup procedure by overwriting 152 the contents of the AV RAM 46 with the contents of the checkpoint RAM 48I (FIG. 3c) which were stored in the checkpoint RAM 48a during step 104. Further, control unit 36 overwrites 154 the contents of the head counter 64 in the freelist unit 34 with the contents of the checkpoint register $68_1$ which were stored in the checkpoint register $68_1$ in step 106. By carrying out these two steps, control unit 36 restores the processor 10 to the state that it had just prior to the branch. Processor backup is thus achieved.

Backstep Procedure

It is sometimes necessary to restore a machine state not only to a checkpointed location but to an instruction which lies between checkpoints. An example of such a situation is one where an instruction encounters a divide-by-zero condition. Since a divide-by-zero is not possible, such an instruction usually invokes an exception trap. Before accessing the trap handler, however, it is first necessary to backstep the machine state to that which existed immediately after the instruction was executed. This "backstep" is usually difficult to achieve because there is no checkpoint created for the instruction since the instruction is not a branch instruction. With the present invention, however, backstepping to an instruction can be performed easily.

Figure 6:
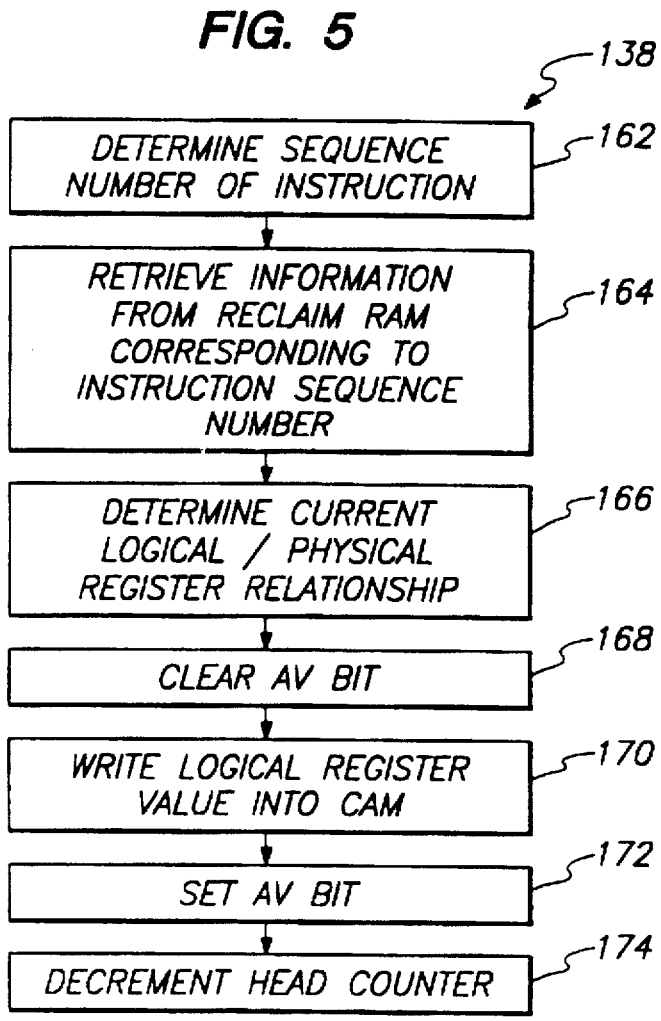
FIG. 6 is a more detailed flow diagram for the backstep process 138 of FIG. 4.

To illustrate this backstep procedure, reference will be made to FIGS. 3b, 4, and 6, and to a specific example. To draw upon a previously used example, suppose again that the instruction Instruction #0: $LR_0 \geq LR_1 \rightarrow LR_3$ is received by the control unit 36 of the register management unit 16. Suppose further again: (1) that the logical register value $LR_3$ is written into the CAM entry corresponding to the physical tag entry $PR_5$ as shown in FIG. 3b, thereby assigning $LR_3$ to physical register $PR_5$; and (2) that the logical register value $LR_3$ and its corresponding former physical register tag $PR_3$ are stored into the reclaim RAM 50 in the entry indexed by the instruction sequence #0. The writing of these values into CAM 42 and reclaim RAM 50 were described previously with reference to steps 108–122 of FIG. 4. Hence, these operations need not be re-described here. The important points to note here are: (1) that there are two instances of $LR_3$ stored in the CAM 42, one corresponding to the currently assigned physical register tag $PR_5$, and one corresponding to the formerly assigned physical register tag $PR_3$; and (2) that the reclaim RAM 50 stores the former relationship between $LR_3$ and $PR_3$. It is the information in reclaim RAM 50 which allows for easy backstepping.

To illustrate how backstepping is achieved, suppose that the data corresponding to $LR_1$ is a zero. If such is the case, then the above instruction would be a divide-by-zero operation. Upon executing this instruction, the execution unit 20 will issue a "backstep" control signal. This signal is detected by control unit 36 in step 136, and in response, control unit 36 carries out the backstep procedure 138 of the present invention. The backstep procedure is shown in greater detail in FIG. 6.

Preferably, control unit 36 begins the backstep procedure by determining 162 the sequence number associated with the instruction which caused the execution exception. In the present example, the sequence number associated with the instruction is 0. Once determined, the instruction sequence number is used as an index to retrieve 164 from the reclaim RAM 50 the logical register value $LR_3$ and its corresponding former physical register tag $PR_3$. Thereafter, control unit 36 applies the logical register value $LR_3$ retrieved from the reclaim RAM 50 to the CAM 42 to determine 166 which physical register is currently assigned to the logical register $LR_3$. As shown in FIG. 3b, physical register $PR_5$ is currently assigned to $LR_3$. Once the current assignment is found, control unit 36 clears 168 the AV bit corresponding to the currently assigned physical register. Hence, in the present example, the AV bit corresponding to $PR_5$ is cleared. Thereafter, control unit 36 writes 170 the logical register value $LR_3$ into the CAM 42 at an entry corresponding to the former physical address tag. Hence, in the present example, $LR_3$ is written into the CAM entry corresponding to the physical register tag $PR_3$. Once that is done, control unit 36 sets 172 the AV bit corresponding to the former physical address tag $PR_3$. By carrying out the above steps, the current logical register/physical register relationship is erased and the former relationship is reinstated. As a final step, the head counter 64 in the freelist unit 34 is decremented 174 so that it once again points to $PR_5$ as it did before the above instruction was processed. Thus, the state of the processor 10 is restored or backstepped to the desired state. The trap handler may now be accessed.

At this point, it should be noted that the backstep procedure is quite similar to the register assignment procedure discussed in steps 108–122 of FIG. 4. The only difference is that instead of assigning the logical register value to a free physical register, the logical register value is assigned back to a physical register with which it had a previous relationship. The similarity between the two processes is significant because it means that the same hardware used to implement the register assignment process can be used to implement the backstep procedure. Thus, very little additional hardware (in fact, a simple additional multiplexer) is required to implement the backstep procedure. This is a significant advantage of the present invention.

The backstepping procedure has been described as backstepping over only one instruction. It should be noted, however, that the method and apparatus of the present invention may be used to backstep over any desired number of instructions. Typically, however, the number of instructions which may be backstepped over is limited to the number of instructions which can be renamed per cycle. This number may vary from system to system.

Instruction Commit

Referring again to FIG. 4, after control unit 36 carries out steps 100–138, it makes a determination as to whether to send a certain physical register tag back to the freelist unit to make the corresponding physical register available again for reassignment. A physical register tag will be sent or released to the freelist unit 34 if the instruction for which the physical register is used is committed. An instruction will be committed if the instruction successfully completed execution and if all previous instructions completed execution without error or exceptions. In step 140, control unit 36 makes a determination as to whether a certain instruction has been committed. If so, then control unit 36 releases the physical register tag or tags associated with the instruction to the freelist unit 34. Continuing with the present example, suppose that the instruction $LR_0 \geq LR_1 \rightarrow LR_3$ is committed. In such a case, the physical register tag $PR_3$ (stored in the reclaim RAM 50) corresponding to the destination register $LR_3$ is passed 142 to the freelist unit 34. More specifically, control unit 36 adds the physical register tag $PR_3$ to the tail of the freelist RAM 62 and then increments the tail counter 66. The free register $PR_3$ is thus added to the list of physical registers which may be assigned to a logical register.

The present invention has been described with reference to specific examples. However, the invention should not be construed to be so limited. Various modifications may be made by one of ordinary skill in the art with the benefit of this disclosure without departing from the spirit of the invention. For example, for the sake of simplicity, the invention has been described with the assumption that only one instruction is issued per cycle. It should be noted, though, that the invention may be and is actually intended to be implemented in processors which issue multiple instructions per clock cycle. To accommodate multiple instructions per cycle, more ports may be added to the register file unit 30, the register reclaim file unit 32, and the freelist unit 34. These and other modifications are within the spirit and contemplation of the invention. Therefore, the present invention should not be limited by the examples used to illustrate it but only by the scope of the appended claims.

What is claimed is:

1. A superscalar processor which concurrently processes a plurality of instructions, the processor comprising:

a register file unit comprising a plurality of physical registers, a logical-to-physical register map comprising a plurality of locations, each of said locations identifying a physical register in response to a logical register value, an address valid map which designates the validity of each of said locations of said logical-to-physical register map, and at least one checkpoint RAM to store said address valid map in response to a speculative branch instruction;

a register reclaim file unit comprising a plurality of locations, each of said locations indexed by an instruction sequence number, each of said locations storing a prior mapping of a logical register to a physical register and having a first portion for storing a logical register value and a second portion for storing a physical register tag which identifies the physical register associated with said logical register during execution of said instruction identified by said instruction sequence number;

a freelist unit which stores a plurality of physical register tags, each tag stored by said freelist unit indicating a free physical register which may be assigned to a logical register, said freelist unit including a head pointer to identify the next tag to be assigned to a logical register, and at least one checkpoint register which stores the value of said head pointer in response to a speculative branch instruction; and a control unit which receives said instructions and determines if an instruction of said received instructions is a speculative branch instruction, and which generates a checkpoint by causing, in response to said speculative branch instruction, the contents of said address valid map to be stored into said checkpoint RAM, and by causing, in response to said speculative branch instruction, storage of the contents of said head pointer to said checkpoint register, said control unit backing up said processor to said checkpoint to restore said processor to a state prior to said speculative branch instruction in response to a misprediction of said branch instruction, said control unit further backstepping said processor to an instruction which lies between two checkpoints in response to an exception condition to restore said processor to a state prior to said exception condition by determining the instruction sequence number of said instruction causing said exception condition, retrieving from said register reclaim file unit the logical register value and the physical register tag corresponding to said instruction sequence number, determining, from said logical-to-physical register map, which physical register is currently assigned to said logical register, invalidating a location in said address valid map corresponding to said current logical to physical register assignment, writing said logical register value obtained from said register reclaim file unit to said logical to physical register map and validating said location in said address valid map.

2. A superscalar processor as set forth in claim 1 wherein the register file unit comprises a plurality of checkpoint RAMs to concurrently store the contents of said address valid map at different points in time.

3. A superscalar processor as set forth in claim 2 wherein the freelist unit further comprises a plurality of checkpoint registers to store the value of said head pointer at different points in time.

4. A superscalar processor as set forth in claim 3 wherein said logical-to-physical register map comprises a read-only-memory which stores a plurality of physical register tags, each of said physical register tags pointing to one of said physical registers and a content addressable memory which stores logical register values corresponding to said physical register tags.

5. A superscalar processor which concurrently processes a plurality of instructions, the processor comprising:

a register file unit comprising a plurality of physical registers, a logical-to-physical register map comprising a plurality of locations, each of said locations identifying a physical register in response to a logical register value, an address valid map which designates the validity of each of said locations of said logical-to-physical register map, and at least one checkpoint RAM to store said address valid map in response to a speculative branch instruction;

a register reclaim file unit comprising a plurality of locations, each of said locations storing a logical register to physical register mapping of a prior instruction;

a freelist unit which stores a plurality of physical register tags, each tag stored by said freelist unit indicating a free physical register which may be assigned to a logical register, said freelist unit further comprising a head pointer to identify the next tag to be assigned to a logical register, and at least one checkpoint register which stores the value of said head pointer in response to a speculative branch instruction; and a control unit for receiving said instructions comprising,
means for determining if an instruction of said received instructions is a speculative branch instruction,
means, responsive to said instruction being a speculative branch instruction, for storing the contents of said address valid map into said checkpoint RAM and for storing the contents of said head pointer to said checkpoint register,
means, responsive to a misprediction of said branch instruction, for restoring said address valid map with the contents of a corresponding checkpoint RAM and for restoring said head pointer with the contents of a corresponding checkpoint register; and
means, responsive to an exception condition for backstepping said processor to an instruction which lies between two checkpoints to restore said processor to a state prior to said exception condition.

6. A superscalar processor as set forth in claim 5 wherein the register file unit comprises a plurality of checkpoint RAMs to concurrently store the contents of said address valid map for a plurality of speculative branch instructions.

7. A superscalar processor as set forth in claim 6 wherein the freelist unit further comprises a plurality of checkpoint registers to store the value of said head pointer for a plurality of speculative branch instructions.

8. A superscalar processor which concurrently processes a plurality of instructions and which includes apparatus for performing out of order instruction execution, the processor comprising:

a register file unit comprising,
a data random-access memory (RAM);
a read-only-memory which stores a plurality of physical register tags, each of said physical register tags pointing to an entry in said data RAM, said entry storing data corresponding to said physical register tag,
a content addressable memory which stores logical register values corresponding to said physical register tags,
an address valid RAM comprising a plurality of locations, each of said locations corresponding to a location in said content addressable memory to designate the validity of the logical register value stored in said location, and at least one checkpoint RAM, comprising a plurality of locations, each of said locations corresponding to a location in said address valid RAM, said checkpoint RAM operable to store the contents of said address valid RAM;

a register reclaim file unit comprising a reclaim RAM comprising a plurality of locations for storing prior mappings of logical registers to physical registers, each location having a first portion for storing a logical register value and a second portion for storing corresponding physical register tag, each of said locations indexed with a sequence number corresponding to a particular instruction, a freelist unit which stores a plurality of physical register tags, each tag stored by said freelist unit indicating a free physical register which may be assigned to a logical register, said freelist unit including a head pointer to identify the next tag to be assigned to a logical register, and at least one checkpoint register which stores the value of said head pointer in response to a speculative branch instruction; and a control unit comprising, means for receiving said instructions and determining if an instruction of said received instructions is a speculative branch instruction, means, responsive to said speculative branch instruction for creating a checkpoint by causing the contents of said address valid RAM to be stored into said checkpoint RAM, and causing storage of the contents of the head counter into one of said checkpoint registers, means, responsive to a mispredicted branch instruction for backing up said processor to said checkpoint to restore said processor to a state prior to said mispredicted branch instruction, means, responsive to an exception condition, for backstepping said processor to an instruction which lies between two checkpoints to restore said processor to a state prior to said exception condition comprising, means for determining the instruction sequence number of said instruction causing said exception condition;

means for retrieving from said register reclaim file unit a logical register value and a corresponding physical register tag corresponding to said instruction sequence number;

means for applying said retrieved logical register value to said content addressable memory to determine a current physical register assigned to said logical register, means for clearing a location in said address valid RAM corresponding to the currently assigned physical register;

means for writing the logical register value retrieved from said register reclaim file unit into the content addressable memory at an entry corresponding to the former physical address tag, and means for setting a bit in the address valid RAM which corresponds to the former physical address tag.

\* \* \* \* \*